Figure 15:
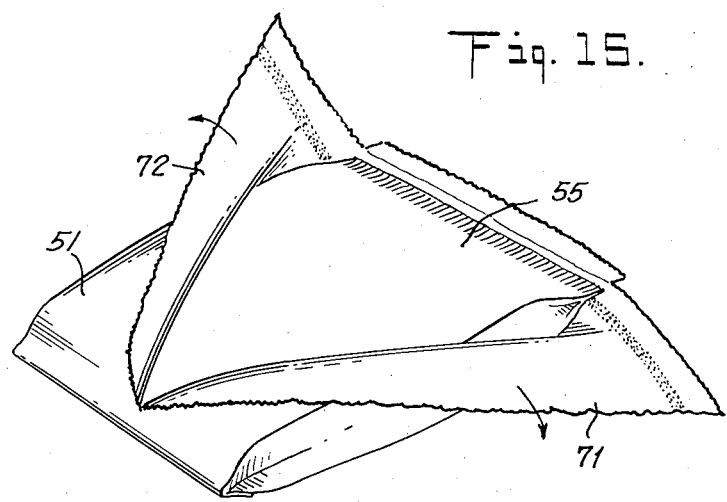
Figure 16:
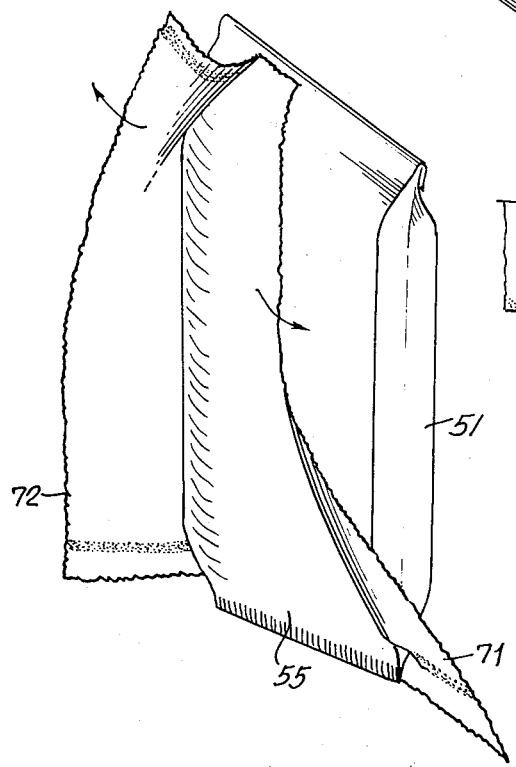
Figure 17:
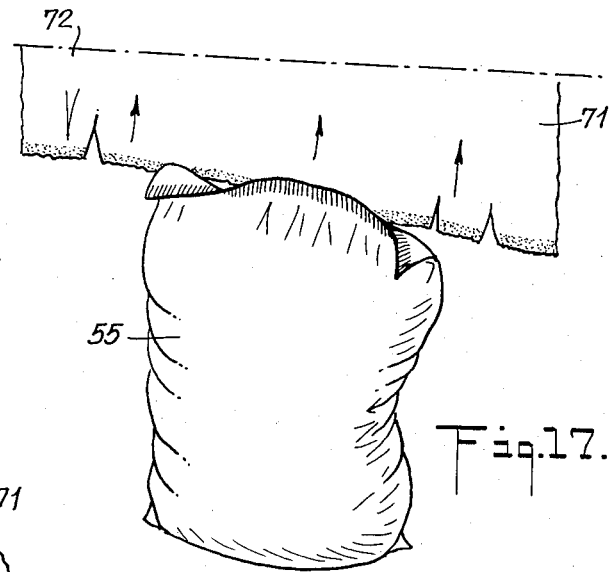

United States Patent [19]
Goodrich

[11] 3,807,626
[45] Apr. 30, 1974

[54] GUSSETED PINCH BOTTOM BREAKAWAY POUCH BAG

[75] Inventor: John J. Goodrich, Pensacola, Fla.

[73] Assignee: St. Regis Paper Company, New York, N.Y.

[22] Filed: Mar. 20, 1972

[21] Appl. No.: 235,908

[52] U.S. Cl............... 229/55, 229/57, 229/62, 229/66
[51] Int. Cl............................................ B65d 33/02
[58] Field of Search............. 229/55, 56, 57, 62, 66

[56] References Cited
UNITED STATES PATENTS

| | | | |
|---|---|---|---|
| 3,687,356 | 8/1972 | Goodrich et al. | 229/55 |
| 3,587,844 | 6/1971 | Wing | 229/69 |
| 3,647,134 | 3/1972 | Carnevalino | 229/55 |

*Primary Examiner*—William T. Dixson, Jr.
*Assistant Examiner*—Stephen P. Garbe
*Attorney, Agent, or Firm*—Cooper, Dunham, Clark, Griffin & Moran

[57] ABSTRACT

A multi-wall bag of tubular form comprising a plurality of plies of flexible sheet material laminated to one another and an innermost ply of heat sealable plastic material loosely bonded to the contiguous ply for manual detachment therefrom, said bag having a pair of oppositely disposed gussets interposed between oppositely disposed surface portions, said plastic and contiguous plies being substantially flush cut at the opposite bag ends, at least the outermost of the remaining plies being stepped in both directions from said plastic and contiguous plies at the bag ends to provide overlap portions with respect thereto, said overlap portions being coated with a thermoplastic adhesive, said plastic ply being heat sealed transversely of said tube at one bag end, and the overlap portion at said end being folded over and adhesively bonded to the opposite bag surface.

11 Claims, 19 Drawing Figures

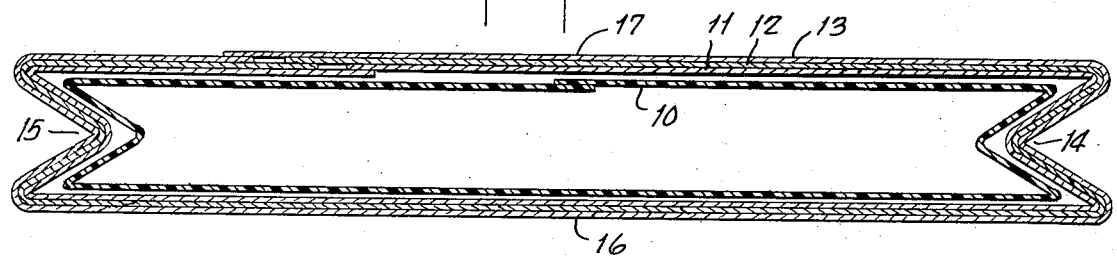
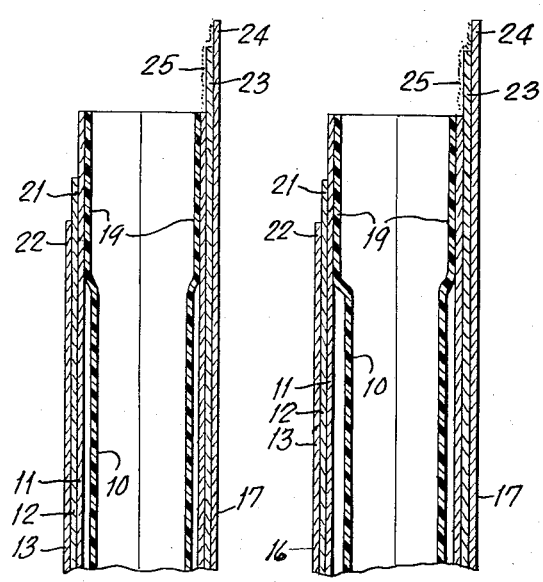
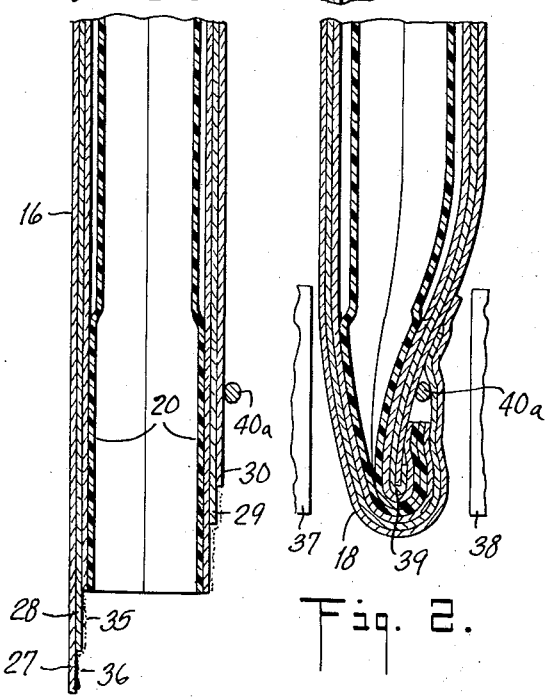
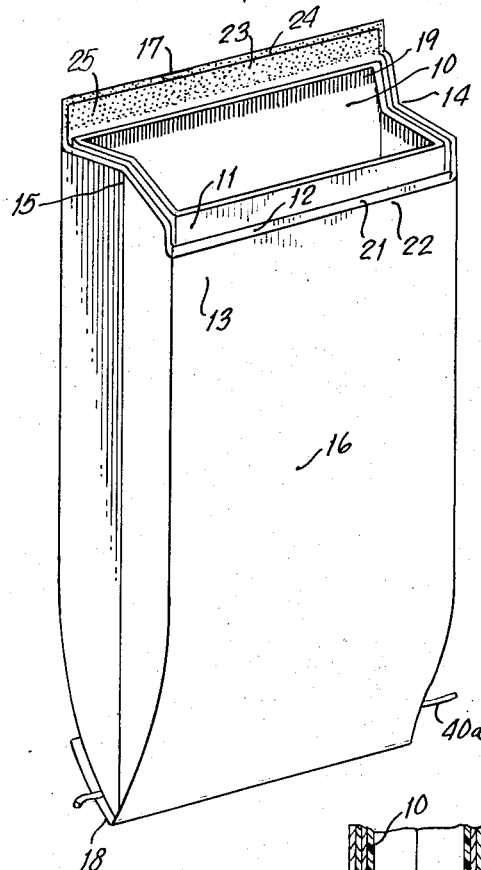
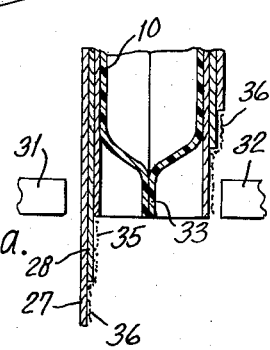

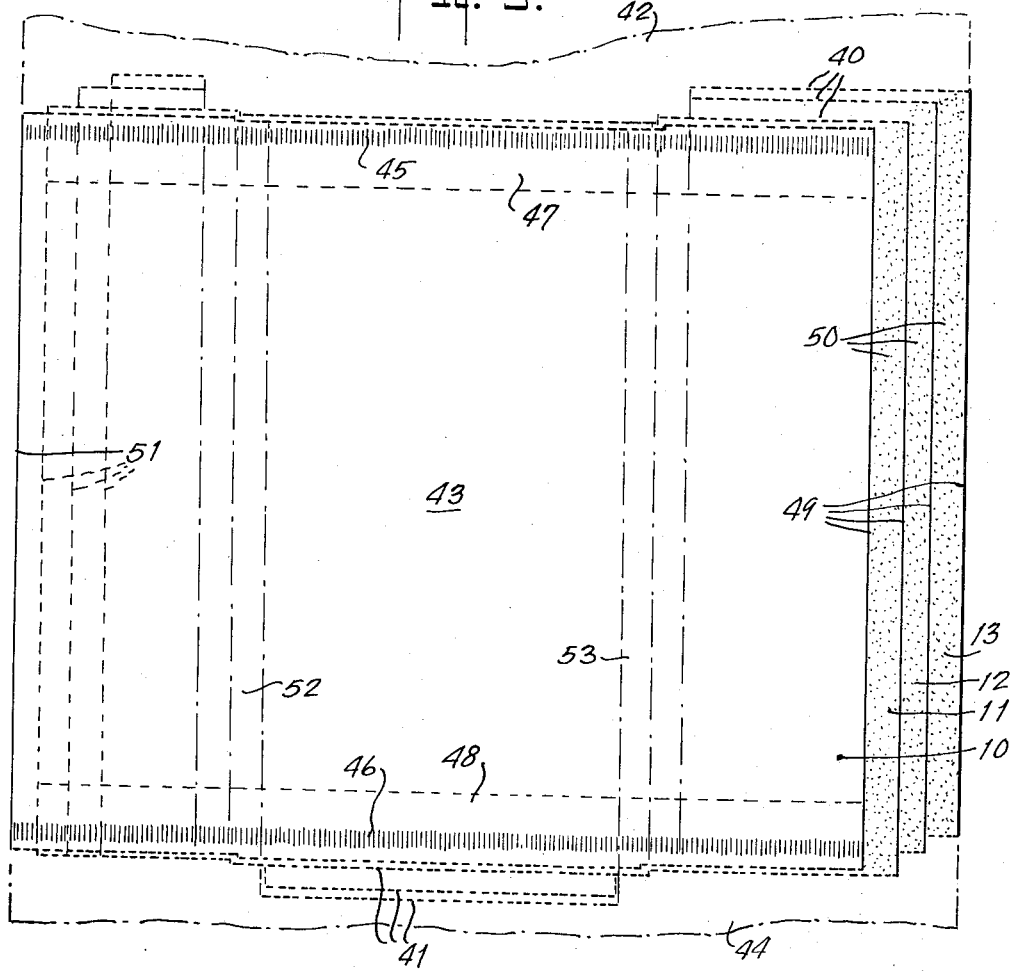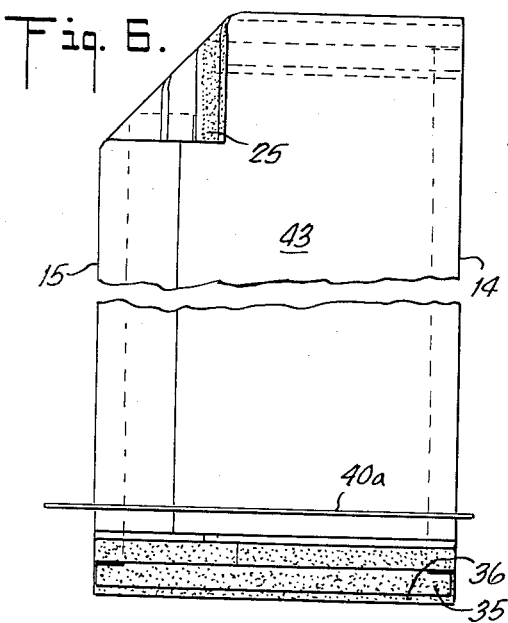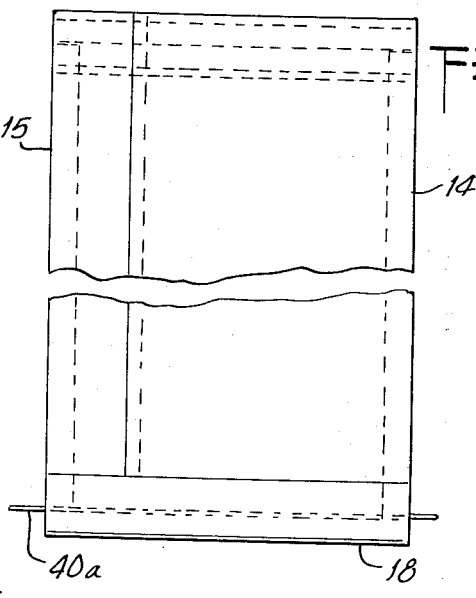

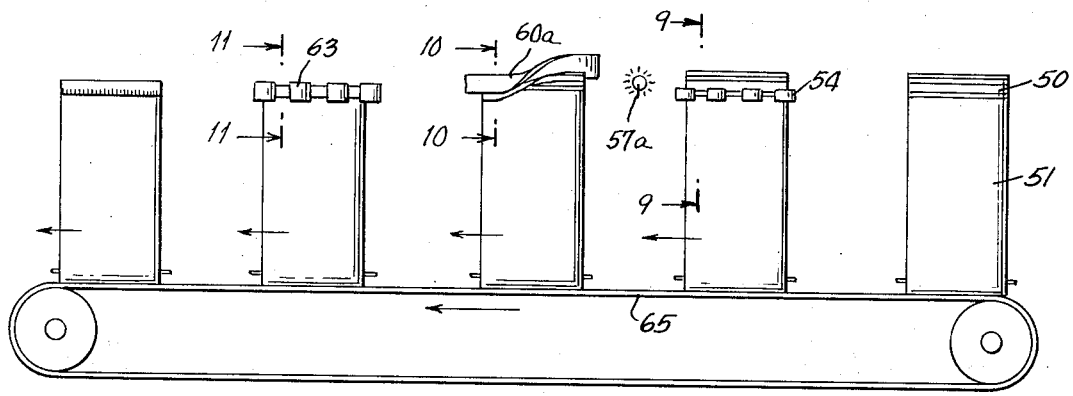
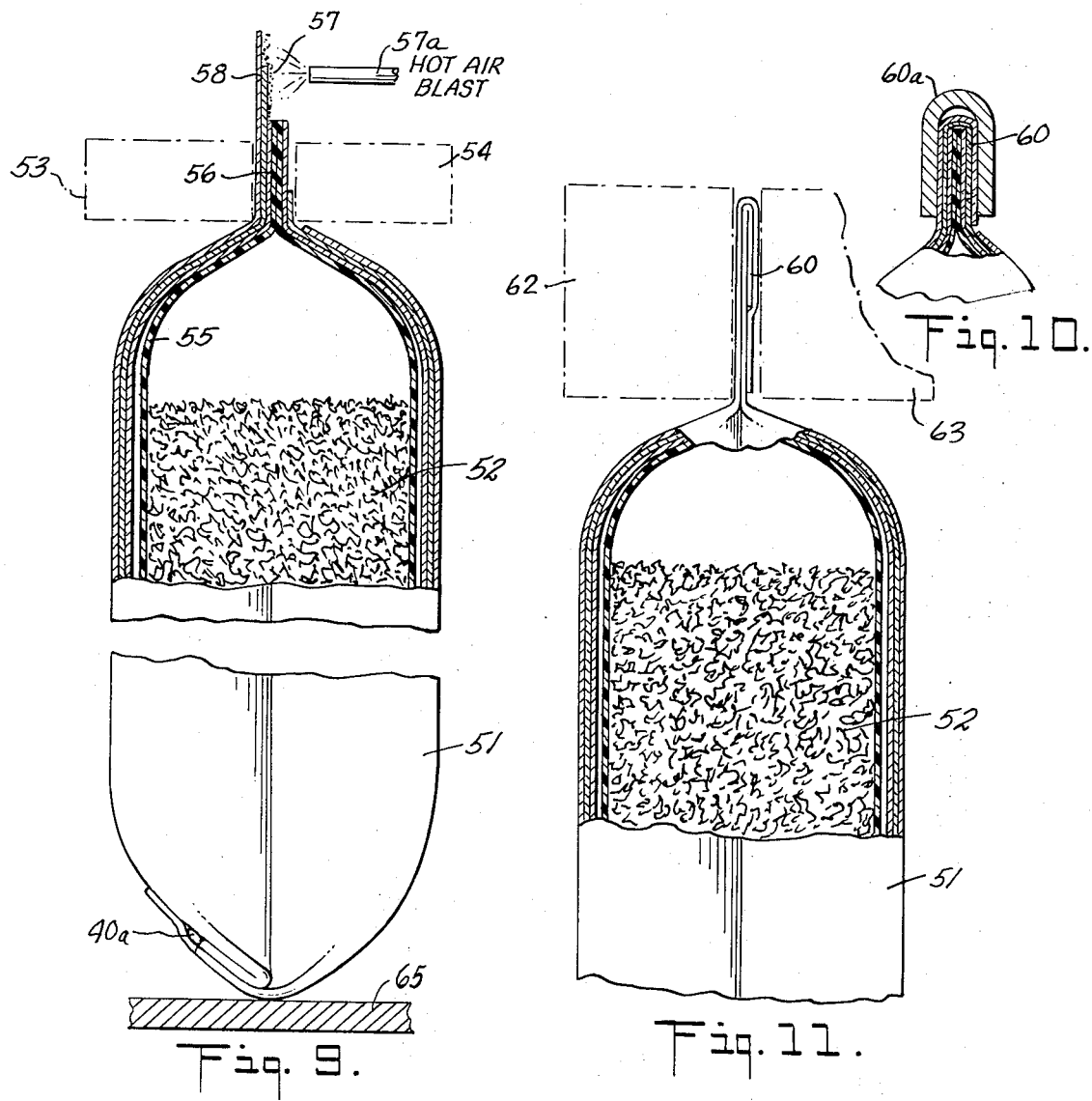

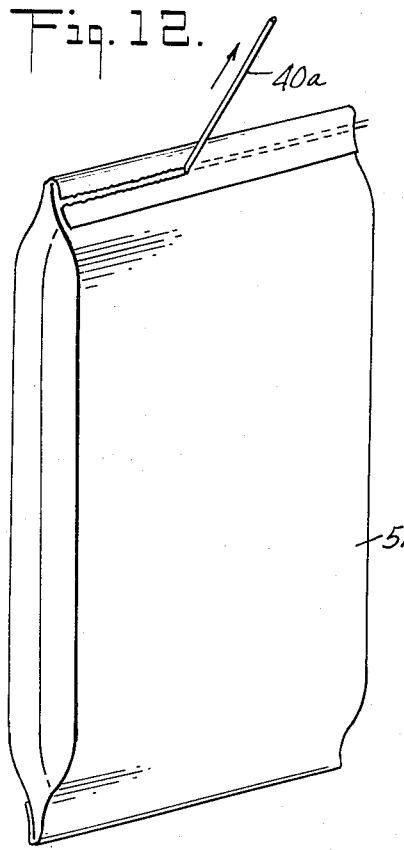
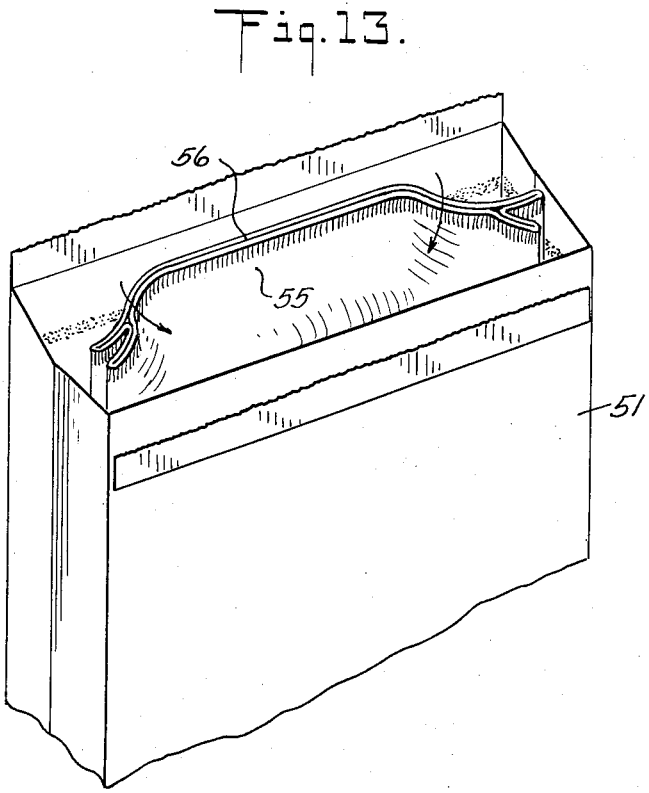
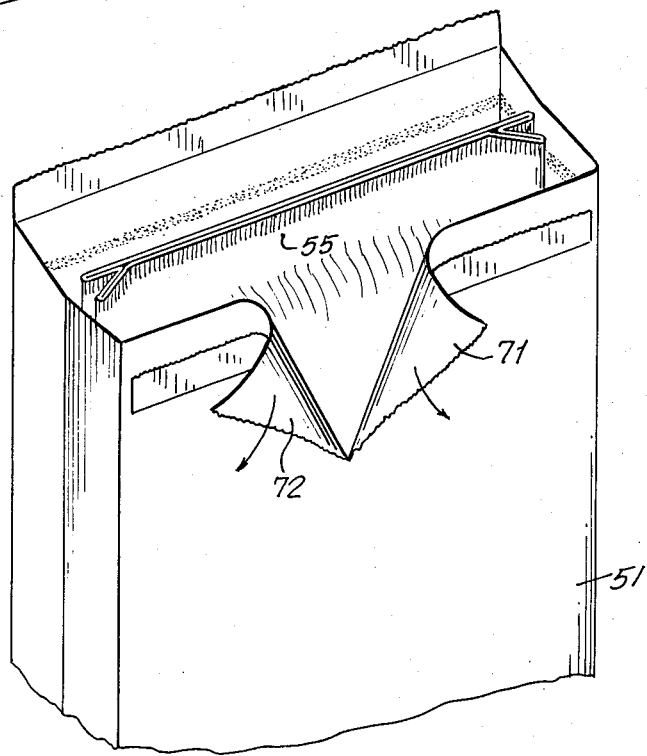

GUSSETED PINCH BOTTOM BREAKAWAY POUCH BAG

This invention pertains to improvements in multi-wall bags of the gusseted and so called pinch bottom type, and to methods of filling and emptying the same under sterile conditions.

In bags of this construction as heretofore produced a plurality of plies of flexible sheet material such as paper are laminated to one another in superimposed relation and formed into a tube having gusseted sidewalls interposed between front and back walls one of which overlaps the other at each bag end, one overlapping end in the bag as manufactured, being folded over and sealed against the opposite wall to provide an open ended bag ready for filling, usually with a bulk, granular or powdery material, whereupon the opposite overlapping end is similarly folded over and sealed against the opposite wall thereby completely to seal the packaged material within the bag enclosure thus formed. Also in such bags as herefore produced, the innermost ply is sometimes provided with a moisture impervious plastic coating, or an innermost ply of plastic material, which is permanently laminated to the innermost ply.

All such conventional bag constructions are objectionable for the packaging of comestibles, such as dry powdered milk, eggs or the like, in that during handling and shipment the bag exteriors become highly contaminated with dust, bacteria and other contaminating substances, to the extent that it becomes extremely difficult if not impossible to prevent contamination of the packaged material when the bag is opened to discharge the contents.

In an effort to prevent such contamination, one practice has consisted in the manual insertion into an open ended paper bag of a separately produced plastic pouch, and then after the pouch within the bag is filled, the pouch itself is manually tied closed at its open end and pushed down into the bag so that it does not interfere with closure of the bag itself, usually by sewing. This practice is objectionable in that it requires that the bag and pouch components be separately produced and the components manually assembled, which is unduly expensive. Also the manual tying of the pouch when filled and subsequent closure of the bag proper retards the closure operations. In addition the manual handling of the plastic pouch in the bag and pouch-assembly and tying operations as well as the subsequent untying to discharge the contents, are sources of potential contamination.

The present invention eliminates these highly objectional features of conventional bag constructions, in the provision of a multi-wall, gusseted bag having an innermost bag ply of a heat sealable plastic material, which in process of bag manufacture on a bag tuber is only loosely adhered to the contiguous paper ply for manual detachment therefrom and which is heat sealed transversely of the bag at the closed end, the bag closure at said end being otherwise completed by folding over an overlapping wall portion of the outermost plies and sealing against the opposite wall. Also when the bag is filled with a comestible or the like, the opposite end of the plastic ply is closed by heat sealing prior to folding over and sealing the overlapping wall portions of the outermost plies at said end. The plastic ply is of such length as not to be included in the sealed bag end closures provided by the outermost plies. The bag may thus be opened in the outermost plies leaving intact the plastic ply and therein packaged contents. And since the plastic ply is only lightly adhered to the contiguous ply, the outer plies may be torn or cut away and peeled off of the plastic ply without rupture thereof for removal of a thus completely sealed and impervious plastic ply container of the packaged material. For removal of the packaged contents without contamination, the exterior of this plastic container may be sterilized and the container slit and its contents discharged under wholly sterile conditions in a sterile atmosphere.

The invention comprises in one of its broader aspects, a multi-wall bag of tubular form comprising a plurality of outer plies of flexible sheet material, such as paper, laminated to one another, and an innermost ply of heat sealable plastic material lightly bonded to the contiguous outer ply for manual detachment therefrom, said bag having a pair of oppositely disposed gussets interposed between oppositely disposed wall portions, the plastic ply and the outer ply contiguous thereto and the gussets being substantially flush cut at the opposite bag ends, and at least the outermost of the remaining plies being stepped in both directions from said plastic and contiguous plies and gussets at the bag ends thus to provide overlap portions with respect thereto, the overlap portions being coated with a thermoplastic adhesive, the plastic ply being heat sealed transversely of said tube at one bag end, and the overlap portion at said end being folded over and adhesively bonded to the opposite bag wall.

In bag constructions according to the invention containing three or more outer or paper plies, the plies exterior to the innermost paper ply are preferably stepped successively in both directions at the bag ends with respect to the innermost ply, to provide at each bag end a stepped up overlap portion which may be folded over the innermost ply and adhesively bonded to the stepped down portions on the opposite bag surface, thus to bond each such outer ply to itself at the bag ends, which greatly increases the overall bonding action at the bag ends and thereby enhances the strength of the bag closures. The gussets may also be stepped up at the bag ends with respect to the innermost ply, with the front and back panel portions thereof either flush cut, or with the back panel portions stepped up with respect to the front panel portion. Also the bag plies may additionally be stepped up in the gusset portions. All such modifications increase the bonding strength of the bag closures upon folding over the overlapping bag ends and sealing against the opposite bag wall portions.

The invention in other of its aspects comprises methods of filling and emptying a bag of the construction above described in a manner such that the bag may be filled with a material to be packaged and completely sealed within the plastic ply prior to closure of the open bag end via the outer plies, and the bag thereafter opened only in the outer plies and the plastic ply with its sealed in contents thence removed intact.

Having thus described the invention in its broader aspects reference will now be had for a detailed description of the above and other aspects to the accompanying drawings wherein:

FIG. 1 is a perspective view of a bag constructed in accordance with a preferred embodiment of the invention, while FIGS. 2 and 3 are enlarged longitudinal and transverse sections thereof showing the constructional details. FIG. 4 is a view similar to FIG. 2 but showing the bag prior to effecting the bottom bag closure. FIG. 4a is a fragmentary sectional view of the lower end of FIG. 4 showing a step in the bag closure operation.

FIGS. 5-7 inc. illustrate a method of producing bags according to the invention, wherein FIG. 5 is a plan view of a web assembly for producing the bag as blanks shown in plan view in FIG. 6, while FIG. 7 is a plan view of a bag as produced from the bag blank of FIG. 6.

FIGS. 8-11 inc. are views illustrating closure of the upper end of the bag of FIGS. 1-3, after it is filled with material to be packaged, wherein FIG. 8 is a view in elevation illustrating the method and apparatus for sealing the upper end of the bag closed in successive steps, while FIGS. 9-11 inc. are fragmentary sectional views of FIG. 8 as taken at 9—9, 10—10 and 11—11 thereof respectively.

FIGS. 12-18 inc. are perspective views of the steps of opening the filled and closed bag of FIG. 11, in such manner as to recover the sealed inner plastic ply and therein packaged contents without opening said ply.

Referring to FIGS. 1-4, the bag comprises an innermost ply 10 of a heat sealable thermoplastic material, and three outer plies 11-13 inc., made preferably of heavy kraft paper, although other suitable flexible sheet stock may be employed. The bag is gusseted along oppositely disposed sidewalls, as at 14, 15, interposed being relatively wide front and rear walls 16, 17.

The bag as manufactured is open at the top as shown and closed at the bottom with a pinch bottom closure as at 18, produced as described below. The paper plies 11-13 inc. are securely laminated to one another at the top and base of the bag as described below, while the plastic ply 10 is only lightly adhered to the contiguous paper ply 11 at the top and base of the bag and blank, as at 19 and 20, FIG. 4.

As best shown in FIG. 1, at the open bag end, the plastic and contiguous paper plies 10, 11 are substantially flush cut in the front and rear walls and in the gussets, and the outer plies 12, 13, are substantially flush cut coincident therewith in the gussets. However, the outer plies 12, 13 are stepped successively downward in the front wall 16 with respect to plies 10, 11, in the manner shown at 21, 22, and are stepped successively upward with respect thereto in the back wall 17, as at 23, 24. In the back wall, therefore, the outer plies 12, 13, extend beyond or overlap all plies in the gusset and front wall portions of the bag at the open end, and thus may be folded over and sealed against the corresponding plies in the front wall, for which purpose the overlap area is coated with a thermoplastic adhesive, as at 25.

As shown in FIG. 4, at the bottom of the bag, the outer plies 12, 13 are correspondingly stepped with respect to the inner plies 10, 11 except in the reverse order as between the back and front walls, and as shown most clearly at 27-30 inc. Closure at the base of the bag to provide the pinch bottom closure 18, FIG. 1, is accomplished in two steps. The first step consists referring to FIG. 4a, in applying heat and pressure between the opposite walls of the blank at the lower end, as by means of hot compression rolls or bars as at 31, 32. This heat seals the oppositely disposed wall portions of the thermoplastic ply to each other as at 33, thus to provide a sealed closure of the ply at the bottom of the bag. A thermoplastic adhesive is then applied to the stepped portions as at 35, 36, FIG. 4a and the overlapping portions 27, 28 of the outer plies 12, 13 are folded over against the opposite wall of the bag as shown in FIG. 2, and compressed between compression rolls or bars as at 37, 38, FIG. 2, to complete the bottom closure of the bag. It will be noted with reference to FIG. 2, that in producing this closure, the outer bag plies 12, 13 are looped about the lower sealed end 33 of the thermoplastic ply 10, as at 39, so that if the bag is subsequently opened at the bottom by slitting only the outer plies 12, 13, the thermoplastic ply will remain intact.

In order to assure opening the bag in this manner, a rip cord or tear string 40a, is interposed as shown in FIG. 2, between the outer paper plies 12, 13 and the contiguous paper ply 11, upon folding over and completing the bag closure in the manner above described.

Referring now to FIG. 5, the bags of the invention may be quantity produced from superimposed webs 10-13 inc. of the plastic and paper plies. The individual webs are transversely perforated as at bag length intervals, as at 40 and 41, to impart the requisite end configurations to the blanks as above described. These perforations are for purposes of subsequently separating the web stock into successive bag blanks, as at 42, 43, 44. As shown in the drawing the perforations at one end of a blank, as at 40, are complementary to those at the opposite end, as at 41, to prevent waste of materials.

The plastic ply 10 is lightly adhered to the contiguous paper ply 11, at the opposite ends of each blank, as at 45, 46. The paper plies are permanently laminated to one another at the bag ends by means of glue applied between them over the areas 47, 48. The webs 10-13 inc. are successively stepped transversely of their lengths, as at 49, to provide longitudinally extending overlap portions to the paper webs 11-13 inc. of which glue is applied, as at 50, in order that the web assembly may be formed into a tube by folding over the stepped overlap portion 49 onto the oppositely stepped portion 51, and adhering while meantime heat sealing the overlapped portions of the plastic ply 10. During the tube forming operation, the web assembly is reversely creased along the lines indicated at 52, 53, to form oppositely disposed gussets, as at 14, 15, in the resultant tubular blank of FIG. 6. The blank is closed at the base in the manner above described with reference to FIGS. 4a and 2 to produce the bag as shown in FIG. 7.

Referring now to FIGS. 8-11 inc., the open end 50 of a bag 51 after filling with material to be packaged, as at 52, is closed as follows. Referring to FIGS. 8 and 9, the first step consists in compressing the opposed upper ends of the bag between hot pressure rolls, as at 53, 54, to heat seal the upper ends of the plastic ply 55 to one another, as at 56. A hot air blast 57a is next applied to heat-activate the thermoplastic adhesive 57 applied to the overlapping portion 58, of the outer piles. The next step as shown in FIGS. 8, 10 and 11 consists in folding over the overlapping end 58 of the outer plies onto the opposite front wall, as at 60, by means of a folding device 60a, and thence compressing between pressure rolls, as at 62, 63.

This sequence of operations is rapidly carried out with the mechanism of FIG. 8, wherein the filled bag 51 is transported on a travelling belt 65, with its open end passing first between the series of the hot pressure rolls 53, 54, thence past the hot air blast 57a, under the folding device 60a for folding the overlap bag portion 58 over onto the opposite bag surface, and thence between the series of pressure rolls 62, 63, for completing the bag closure.

Figure 18:
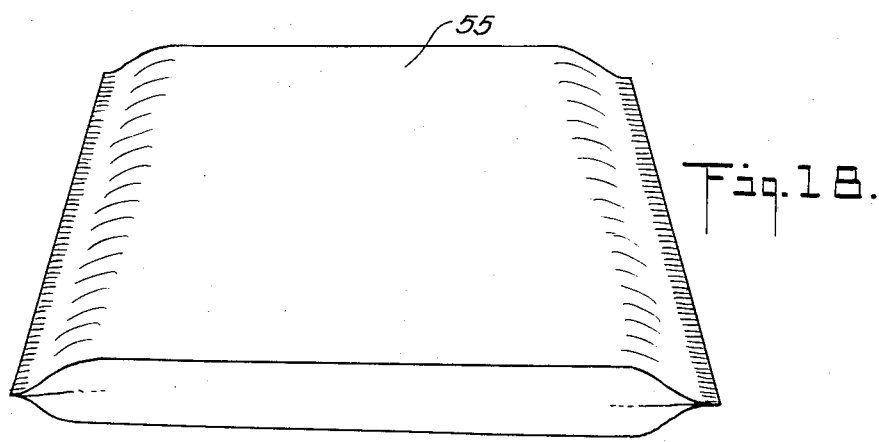

Referring now to FIGS. 12–18 inc., in order to remove from a bag 51 filled with a packaged material and sealed closed top and bottom as in FIG. 11, the thermoplastic ply and therein sealed packaged contents without rupturing said ply, the bag is opened in the outer plies only, by pulling on the tear cord 40a as in FIG. 12, thereby to expose as in FIG. 13, the upper sealed end 56 of the plastic ply 55. Since as above pointed out, the plastic ply is only lightly adhered to the contiguous paper ply, all paper plies may now be torn away from the plastic ply in the manner illustrated at 71, 72, in FIGS. 14–17 inc. and the unruptured plastic ply 55 filled with the packaged contents, thus obtained intact, as shown in FIG. 18.

The heat sealable thermoplastic inner ply in bags of the invention may be made of various materials, such for example as polyolefines such as polyethylene and polypropylene, polyamides such as nylon and polyesters such as polyalkylene derivatives of polycarboxylic acids especially polyethylene terephthlite.

What is claimed is:

1. A multi-wall bag of tubular form comprising a plurality of plies of flexible sheet material laminated to one another and an innermost ply of heat sealable plastic material loosely bonded to the contiguous ply for manual detachment therefrom, said bag having a pair of oppositely disposed surface portions and a pair of oppositely disposed gussets interposed between said surface portions, said plastic and contiguous plies being substantially flush cut at the opposite bag ends, at least the outermost of the remaining plies being stepped from said plastic and contiguous plies at the bag ends to provide overlap portions with respect thereto, said overlap portions being coated with a thermoplastic adhesive, said plastic ply being heat sealed transversely of said tube at one bag end, and the overlap portion at said end being folded over with said sealed end of said plastic ply and adhesively bonded to the opposite bag surface.

2. A multi-wall bag of tubular form comprising a plurality of plies of flexible sheet material laminated to one another and an innermost ply of heat sealable plastic material loosely bonded to the contiguous ply for manual detachment therefrom, said bag having a pair of oppositely disposed surface portions and a pair of oppositely disposed gussets interposed between said surface portions, said plastic and contiguous plies and said gussets being substantially flush cut at the opposite bag ends, and at least the outermost of the remaining plies being stepped from said plastic and contiguous plies and gussets at the bag ends thus to provide overlap portions with respect thereto, said overlap portions being coated with a thermoplastic adhesive, said plastic ply being heat sealed transversely of said tube at one bag end, and the overlap portion at said end being folded over with said sealed end of said plastic ply and adhesively bonded to the opposite bag surface.

3. A multi-wall bag of tubular form comprising a plurality of plies of flexible sheet material laminated to one another and an innermost ply of heat sealable plastic material loosely bonded to the contiguous ply for manual detachment therefrom, said bag having a pair of oppositely disposed surface portions and a pair of oppositely disposed gussets interposed between said surface portions, said plastic and contiguous plies being substantially flush cut at the opposite bag ends, at least the outermost of the remaining plies being stepped from said plastic and contiguous plies at the bag ends thus to provide overlap portions with respect thereto, said gussets terminating in said overlap portions, said overlap portions being coated with a thermoplastic adhesive, said plastic ply being heat sealed transversely of said tube at one bag end, and the overlap portion at said end being folded over with said sealed end of said plastic ply and adhesively bonded to the opposite bag surface.

4. A multi-wall bag of tubular form comprising a plurality of plies of flexible sheet material laminated to one another and an innermost ply of heat sealable plastic material loosely bonded to the contiguous ply for manual detachment therefrom, said bag having a pair of oppositely disposed surface portions and a pair of oppositely disposed gussets interposed between said surface portions, said plastic and contiguous plies being substantially flush cut at the opposite bag ends, and at least the outermost of the remaining plies being stepped from said plastic and contiguous plies at the bag ends thus to provide overlap portions with respect thereto, opposed portions of said gussets being successively stepped within said overlap portions, said overlap portions being coated with a thermoplastic adhesive, said plastic ply being heat sealed transversely of said tube at one bag end, and the overlap portion at said end being folded over with said sealed end of said plastic ply and adhesively bonded to the opposite bag surface.

5. A multi-wall bag of tubular form comprising at least three plies of flexible sheet material laminated to one another and an innermost ply of heat sealable plastic material loosely bonded to the contiguous ply for manual detachment therefrom, said bag having a pair of oppositely disposed surface portions and a pair of oppositely disposed gussets interposed between said surface portions, said plastic and contiguous plies being substantially flush cut at the opposite bag ends, the remaining plies being successively stepped in both directions from said plastic and contiguous plies at the bag ends thus to provide overlap portions with respect thereto, said overlap portions being coated with a thermoplastic adhesive, said plastic ply being heat sealed transversely of said tube at one bag end, and the overlap portion at said end being folded over said sealed end of said plastic ply and adhesively bonded to opposite bag surface.

6. A multi-wall bag of tubular form comprising a plurality of plies of flexible sheet material laminated to one another and an innermost ply of heat sealable plastic material loosely bonded to the contiguous ply for manual detachment therefrom, said bag having a pair of oppositely disposed surface portions and a pair of oppositely disposed gussets interposed between said surface portions, said plastic and contiguous plies and said gussets being substantially flush cut at the opposite bag ends, and at least the outermost of the remaining plies being stepped in both directions from said plastic and contiguous plies and gussets at the bag ends thus to provide overlap portions with respect thereto, said overlap portions being coated with a thermoplastic adhesive, the overlap portion at one end being folded over and adhesively bonded to the opposite bag surface, and said plastic ply being heat sealed transversely of said bag at a distance sufficiently removed from said folded over portion to permit detachment from said contiguous ply and withdrawal of said plastic ply from said bag.

7. A multi-wall bag of tubular form comprising at least three plies of flexible sheet material laminated to one another and an innermost ply of heat sealable plastic material loosely bonded to the contiguous ply at the opposite bag ends for manual detachment therefrom, said bag having a pair of oppositely disposed surface portions and a pair of oppositely disposed gussets interposed between said surface portions, said plastic and contiguous plies and said gussets being substantially flush cut at the opposite bag ends, the remaining plies being stepped by substantially equal increments in both directions from said plastic and contiguous plies and gussets at the bag ends thus to provide overlap portions with respect thereto, said stepped portions being coated with a thermoplastic adhesive, said plastic ply being heat sealed transversely of said tube at one bag end, and the overlap portion at said end being folded over about said sealed end of said plastic ply and adhesively bonded to the opposite bag surface.

8. A multi-wall bag of tubular configuration comprising at least two outer plies of flexible sheet material laminated together and an inner ply of plastic material lightly adhered to the contiguous outer ply at spaced intervals thereof for manual detachment therefrom, said bag being longitudinally and reversely creased along oppositely disposed portions thereof to provide a pair of oppositely disposed wall portions and a pair of oppositely disposed gussets interposed between said wall portions, at least the outermost ply extending in one wall portion beyond the other wall portion at each end of said bag to provide overlap wall portions at said ends respectively, said inner ply terminating within said overlap portions at each said bag end, said overlap portions being coated with an adhesive, said inner ply being sealed closed at one said bag end, and said overlap wall portion at said bag end being folded over said closed end of said inner ply and adhered to the opposite wall portion, leaving said closed end of said inner ply unattached to the contiguous outer ply.

9. A bag according to claim 8 in which said inner ply is composed of a heat sealable plastic material and in which said overlap wall portions are coated with a heat reactive adhesive.

10. A bag according to claim 8 wherein said inner ply and the outer ply contiguous thereto are substantially flush cut transversely of said bag at said bag ends.

11. A bag according to claim 10 in which at each bag end, said outer plies other than said contiguous outer ply are successively stepped up in one said wall portion with respect to said contiguous ply and successively stepped down in the opposite wall portions with respect to said contiguous ply.

* * * * *